(No Model.)
A. J. PALMER.
Fruit Evaporator.
No. 236,836. Patented Jan. 18, 1881.
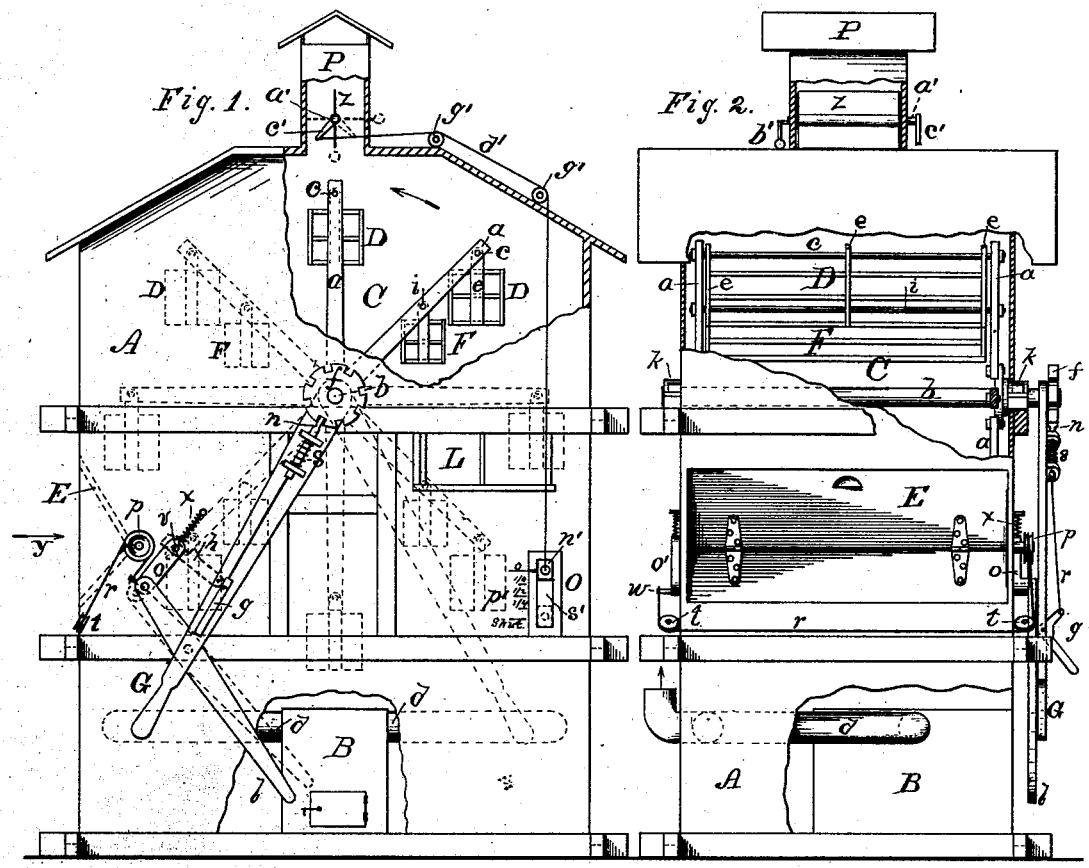
Attest:
A. P. Ely
Henry E. White
Inventor:
A. J. Palmer
By E. B. Whitmore, Atty.

UNITED STATES PATENT OFFICE.

ALFRED J. PALMER, OF GAINES, ASSIGNOR OF ONE-HALF TO JOHN D. WARREN & CO., OF LYNDONVILLE, NEW YORK.

FRUIT-EVAPORATOR.

SPECIFICATION forming part of Letters Patent No. 236,836, dated January 18, 1881.

Application filed October 27, 1880. (No model.)

*To all whom it may concern:*

Be it known that I, ALFRED J. PALMER, of Gaines, in the county of Orleans and State of New York, have invented a new and useful Improvement in Fruit-Evaporators, which improvement is fully set forth in the following specification and accompanying drawings.

The object of my invention is to produce a convenient and economical device for drying fruit and vegetables in large quantities by either furnace or steam heat; and it consists in an inclosure or house containing a suitable heating apparatus and a device for holding the fruit, by means of which the fruit may be moved from place to place within the inclosure during the process of drying, and the employment of other various means and devices, all of which are hereinafter fully explained, and more particularly pointed out in the claims.

Figure 1 of the drawings is a front elevation of the house or inclosure, with parts broken away to uncover some of the inclosed parts; Fig. 2, a side elevation of the same with parts broken away; and Fig. 3, a detail.

A in the drawings is a house or inclosure having a rectangular base, and of any convenient size and proportion.

B is a furnace or boiler, or some suitable heating apparatus, having heat-pipes $d$ arranged within the lower part of the house A.

C is a reel-shaped device, turning upon a horizontal shaft, $b$, which reaches through the house from side to side and rests in journal-boxes $k\ k$. The reel C has eight radial arms, $a$, at each end, standing opposite each other, as shown, at the ends of which parallel bolt-rods $c$ pass across from one arm to the other. From the respective rods $c$ are suspended suitable frames or fruit-cradles, D, for holding removable fruit-trays, said cradles being held to the rods each by three suspenders, $e\ e\ e$, situated respectively at the ends and middle of the cradle. The suspenders $e$ are fitted loosely upon the rods $c$, so that the cradles shall depend from said rods at all times, whatever may be the position of the reel, the cradles being of such length as to just swing within the arms of the reel when the latter is rotated. Other bolt-rods, $i$, similar to the rods $c$, reach from arm to arm of the reel, nearer to the center shaft, $b$, from which other fruit-cradles, F, similarly depend.

The reel is rotated by means of a hand-lever, G, made to swing loosely upon the overhanging end of the shaft $b$, a notched wheel, $f$, being secured to said shaft by the side of said lever. A pawl, $n$, at the side of the lever G, is carried into a notch of the wheel when presented by a spiral spring, $s$, which locks the lever G to the wheel $f$, by means of which the reel may be rotated. The pawl $n$ is drawn out of the notch by means of a bent lever, $g$, fulcrumed in the lever G, and connected by a rod or cord with the said pawl when it is wished to swing the lever independent of the reel.

A latch, $h$, Figs. 1 and 3, is hinged on the inside of the wall of the house in position to catch and hold the ends of the arms $a$ of the reel, and thus lock said reel in any desired position. There are two of such latches, one (not shown) being on the inner opposite side of the house from the one shown and engaging the corresponding arm at the other end of the reel. If the reel be loaded heavier on one side than the other, these latches prevent it rotating in consequence.

When the reel is to be purposely turned by the lever G the latches are drawn back to disengage the arms of the reel by the attendant by means of a lever, $l$. A connecting-link, $o$, connects the lever $l$ with the latch $h$ by means of a stud, $v$, which projects from said latch, through a slot, $u$, Fig. 3, in the wall of the house. A cord, $r$, attached to a pin at the end of the lever $l$, passes over a pulley, $p$, and down over other pulleys, $t\ t$, Fig. 2, and to a pin, $w$, of a connecting-link, $o'$, corresponding to the link $o$ above described. The link $o'$ is connected to the latch above mentioned, opposite the latch $h$, by means of a stud similar to the stud $v$, passing through a slot in the wall of the house equal to the slot $u$, (shown in Fig. 3.)

It will be understood from the foregoing description of the lever $l$ and its connections that if the lower end of the lever be carried upward the two latches will be simultaneously drawn back from the arms of the reel, allowing the latter to be rotated.

Spiral springs $x\ x$, attached to the ends of the links $o\ o'$, respectively keep the latches against the ends of the arms when not drawn back by the lever l.

E is a door, which, when opened, allows trays of fresh fruit to be placed within the cradles and the trays of dried fruit to be removed therefrom, the trays being slid sidewise into and out of said cradles. I prefer, however, to load and unload the inner cradles, F, through a doorway, L, cut through the front of the house, sliding the fruit-trays in and out of the said cradles endwise.

P is a chimney or flue rising from the roof of the house, out through which the vapor from the drying fruit passes. A damper or valve, $z$, which is a thin sheet of metal hung upon a horizontal shaft, $a'$, may be made to close, or partially close, the flue at any time, when necessary, by turning the shaft in its bearings. A weighted arm, $b'$, is attached to the shaft $a'$ in such relation to the valve as to cause the latter to stand vertically within the flue when in its normal position. A crank-arm, $c'$, secured to the opposite end of the shaft from the weighted arm $b'$, is connected by a cord, $d'$, with a sliding button, $n'$, of a graduated indicator, O, said cord passing over pulleys $g'$ on the roof of the house. When the button $n'$ is brought to the bottom of the slot $s'$ the valve $z$ will be brought horizontally across within the flue, closing the same, as shown in dotted position. Different positions of the button $n'$ in the slot indicate, by the scale $p'$, corresponding positions of the valve in the flue. The device O being within reach of the attendant saves climbing to the roof of the house to regulate the valve.

A pin, $e'$, Fig. 3, forms a stop for the latch $h$, to prevent the latter being drawn in the way of the arms of the reel by the spring $x$. The slanted part $v'$ of the latch causes the latter to be pressed back by the approaching arm until the notch $z'$ of the latch is reached by said arm, when the spring $x$ brings the latch upward, and the arm is held as shown.

What I claim as my invention, and wish to secure by Letters Patent, is—

1. In combination with a house, A, a reel, C, having arms $a$ and rods $c$ and $i$, for holding fruit-cradles D and F, the shaft $b$ of which reel being provided with a notched wheel, $f$, and a lever, G, with its spring-pawl $n$, and device $g$, for operating said pawl.

2. A reel, C, with its arms $a$, fruit-cradles D and F, and operating device, substantially as shown, in combination with a locking-latch, $h$, for said arms, substantially as described.

A. J. PALMER.

Witnesses:
E. B. WHITMORE,
M. D. PHILLIPS.